United States Patent
Tamura et al.

(10) Patent No.: US 8,274,888 B2
(45) Date of Patent: Sep. 25, 2012

(54) WIRELESS LAN DEVICE

(75) Inventors: Nobuhiro Tamura, Nagoya (JP); Tetsuya Inada, Nagoya (JP)

(73) Assignee: Buffalo Inc., Nagoya (JP)

( * ) Notice: Subject to any disclaimer, the term of this patent is extended or adjusted under 35 U.S.C. 154(b) by 293 days.

(21) Appl. No.: 12/790,493

(22) Filed: May 28, 2010

(65) Prior Publication Data

US 2010/0303001 A1 Dec. 2, 2010

(30) Foreign Application Priority Data

May 29, 2009 (JP) ................................ 2009-130254

(51) Int. Cl.
*H04L 12/28* (2006.01)
*H04L 12/56* (2006.01)
*H04W 4/00* (2009.01)
*G06F 15/16* (2006.01)

(52) U.S. Cl. ..................... 370/230; 370/338; 370/395.2; 370/401; 455/426.1; 709/227

(58) Field of Classification Search ................. 455/13.1, 455/422.1, 426.1, 427, 431–466; 709/227–250; 370/229–238.1, 310–356, 389–394, 400–402, 370/464–477, 395.2

See application file for complete search history.

(56) References Cited

U.S. PATENT DOCUMENTS

| | | | | |
|---|---|---|---|---|
| 7,567,805 B2 * | 7/2009 | Cox et al. | .................... | 455/435.1 |
| 7,986,670 B2 * | 7/2011 | Babbar et al. | .................. | 370/331 |
| 7,990,936 B2 * | 8/2011 | Park et al. | ..................... | 370/338 |
| 8,161,148 B2 * | 4/2012 | Tamura | ......................... | 709/223 |
| 2010/0312875 A1 * | 12/2010 | Wilerson et al. | .............. | 709/224 |

FOREIGN PATENT DOCUMENTS

| | | |
|---|---|---|
| JP | 2004-357057 | 12/2004 |
| JP | 2008-66892 | 3/2008 |
| JP | 2009-44309 | 2/2009 |
| JP | 2010-166222 | 7/2010 |

OTHER PUBLICATIONS http://buffalo.jp/products/catalog/network/wii-uc-g/, May 29, 2009, pp. 1-7.
Notification of Reason(s) for Rejection dated May 15, 2012 from Japanese Application No. 2011-044762.
Notification of Reason(s) for Rejections dated May 15, 2012 from Japanese Application No. 2011-044759.

* cited by examiner

*Primary Examiner* — Tri H Phan
(74) *Attorney, Agent, or Firm* — Beyer Law Group LLP

(57) ABSTRACT

The wireless LAN device 10 includes a packet transmission controller 102 having the function of transmitting a DHCP-DISCOVER packet from a LAN switch 130 to wired devices and the function of causing an RF device to transmit a Probe Request packet to other wireless LAN devices through an antenna 150; a first operation controller 104 that can set the wireless LAN device 10 in the operating mode where the wireless LAN device 10 can operate as an access point, when the wireless LAN device 10 receives DCHPOFFER packet; and a second operation controller 106 that can set the wireless LAN device 10 in the operating mode where the wireless LAN device 10 can operate as a client, when the wireless LAN device 10 receives a Probe Response packet.

8 Claims, 7 Drawing Sheets

WIRELESS LAN DEVICE

1. TECHNICAL FIELD

The present invention relates to a wireless LAN device.

The entire disclosure of Japanese patent application No. 2009-130254, of BUFFALO Inc. is hereby incorporated by reference into this document.

2. RELATED ART

As the Internet has grown, there has been an associated expansion in number of various network devices connectable to networks such as LANs (Local Area Networks). Such network devices are available as wired network devices for wired connection to a network, and wireless network devices that connect wirelessly to a network.

In recent years, wireless LAN devices that relay communications between wired network devices and wireless network devices have also become widespread. Such wireless LAN devices have a wired communication section for communication with wired network devices, and a wireless communication section for communication with wireless network devices. Examples of such wireless LAN devices are an access point (bridge) that functions as a so-called base station in a wireless LAN, and a LAN converter (e.g. an Ethernet™ converter) that functions as a so-called wireless terminal. Wireless LAN devices that can be utilized either as a base station or a wireless terminal by switching the operating mode settings are also common.

However, the wireless LAN device mentioned above, which is utilizable either as a base station or a wireless terminal, requires that the user perform switching of the operating mode configuration. Configuration of the wireless LAN device, including switching of the operating mode, can be complicated and difficult for a user who is not experienced with wireless LAN devices. Even a user familiar with wireless LAN devices may make mistakes in configuration. Accordingly, there was a need to automate the wireless LAN device configuration process.

The present invention, which has been made to solve the above mentioned problems, aims to automate the setting of the operating modes of a wireless LAN device that can operate as both a wireless base station and a wireless terminal through switching the setting of the operating modes.

SUMMARY

The present invention has been made to solve at least one of the above problems and can be realized in the following modes of practice or examples of application.

According to one aspect of the invention, there is provided a wireless LAN device that can be wired to a first network device, wirelessly connected to a second network device, and adapted to relay communications between the first network device and the second network device, comprising:

a wired communication section for communicating with the first network device;

a wireless communication section for communicating with the second network device; and a controller for controlling the operation of the wireless LAN device so that the wireless LAN device operates as an access point or a client in a wireless LAN;

wherein the controller includes:

a packet transmission controller that has a function of transmitting a DHCPDISCOVER packet from the wired communication section to the first network device at prescribed timing and a function of transmitting a Probe Request packet from the wireless communication section to the second network device at prescribed timing;

a first operation controller that can control the operation of the wireless LAN device so that the wireless LAN device can operate as the access point when the wired communication section receives a DCHPOFFER packet from the first network device in response to the DHCPDISCOVER packet; and a second operation controller that can control the operation of the wireless LAN device so that the wireless LAN device can operate as the client when the wireless communication section receives a Probe Response packet from the second network device in response to the Probe Request packet.

In the case where the first network device has the function of a DHCP (Dynamic Host Configuration Protocol) server, when the first network device receives a DHCPDISCOVER packet, it sends back, in response to the DHCPDISCOVER packet, a DHCPOFFER packet to the wireless LAN device that sent the DHCPDISCOVER packet. On the other hand, in the case where the first network device lacks the function of a DHCP server the first wireless LAN device, despite having received a DHCPDISCOVER packet, cannot send back a DHCPOFFER packet to the wireless LAN device that sent the DHCPDISCOVER packet.

In the case where the second network device is an access point (wireless base station), when the second network device receives a Probe Request packet, it sends back, in response to the Probe Request packet, a Probe Response packet to the wireless LAN device that sent the Probe Request packet. On the other hand, in the case where the second network device is not an access point (wireless base station), the second network device, despite having received a Probe Request packet, cannot send back a Probe Response packet to the wireless LAN device that sent the Probe Request packet.

In the case where the wireless LAN device according to the above aspect receives a DHCPOFFER packet from the first network device in response to a DHCPDISCOVER packet, this means that a network device having the functions of a DHCP server is connected to the wireless LAN device. In this case, the first operation controller of the wireless LAN device of the above aspect can control the operation of the wireless LAN device in access point mode (wireless base station mode) so as to enable the wireless LAN device to operate as an access point (wireless base station). In the case where the wireless LAN device according to the above aspect receives a Probe Response packet from the second network device in response to a Probe Request packet, this means that there is an access point (wireless base station) existing on the wireless LAN. In this case, the second operation controller of the wireless LAN device of the above aspect can control the operation of the wireless LAN device in client mode (wireless terminal mode) so as to enable the wireless LAN device to operate as a client (wireless terminal).

Consequently, the wireless LAN device of the above aspect does not require the user to select between the operating mode in which the wireless LAN device operates as a wireless base station and the operating mode in which it operates as a wireless terminal. Namely, with the wireless LAN device of the above aspect, it is possible to automate the setting of its operating modes in which it operates as a wireless base station and as a wireless terminal, through switching of the operating modes. Because the wireless LAN device of the above aspect affords the automated setting of operating modes as described above, and thus avoids errors in setting operating modes introduced through human error, the device is especially effective for building a wireless LAN having a star topology composed of a single wireless base station (access point) and plural wireless terminals (clients).

Where the present invention is provided as a computer program or a recording medium having the program recorded thereon, it may constitute the program for controlling the entire operation of the wireless LAN device, or only that portion for carrying out the function of the present invention. Further, as recording media may be employed various computer-readable media such as a flexible disk, CD-ROM, DVD-ROM, magneto-optical disk, IC card, ROM cartridge, printed matter imprinted with symbols such as a bar code, computer internal memory devices (memory such as RAM and ROM), and external memory devices.

These and other objects, features, aspects, and advantages of the present invention will become more apparent from the following detailed description of the embodiments with the accompanying drawings.

DETAILED DESCRIPTION OF THE EMBODIMENTS

The modes of the invention are described below based on certain preferred embodiments.

A. Embodiment 1

A1. Features of Network System

Figure 1:
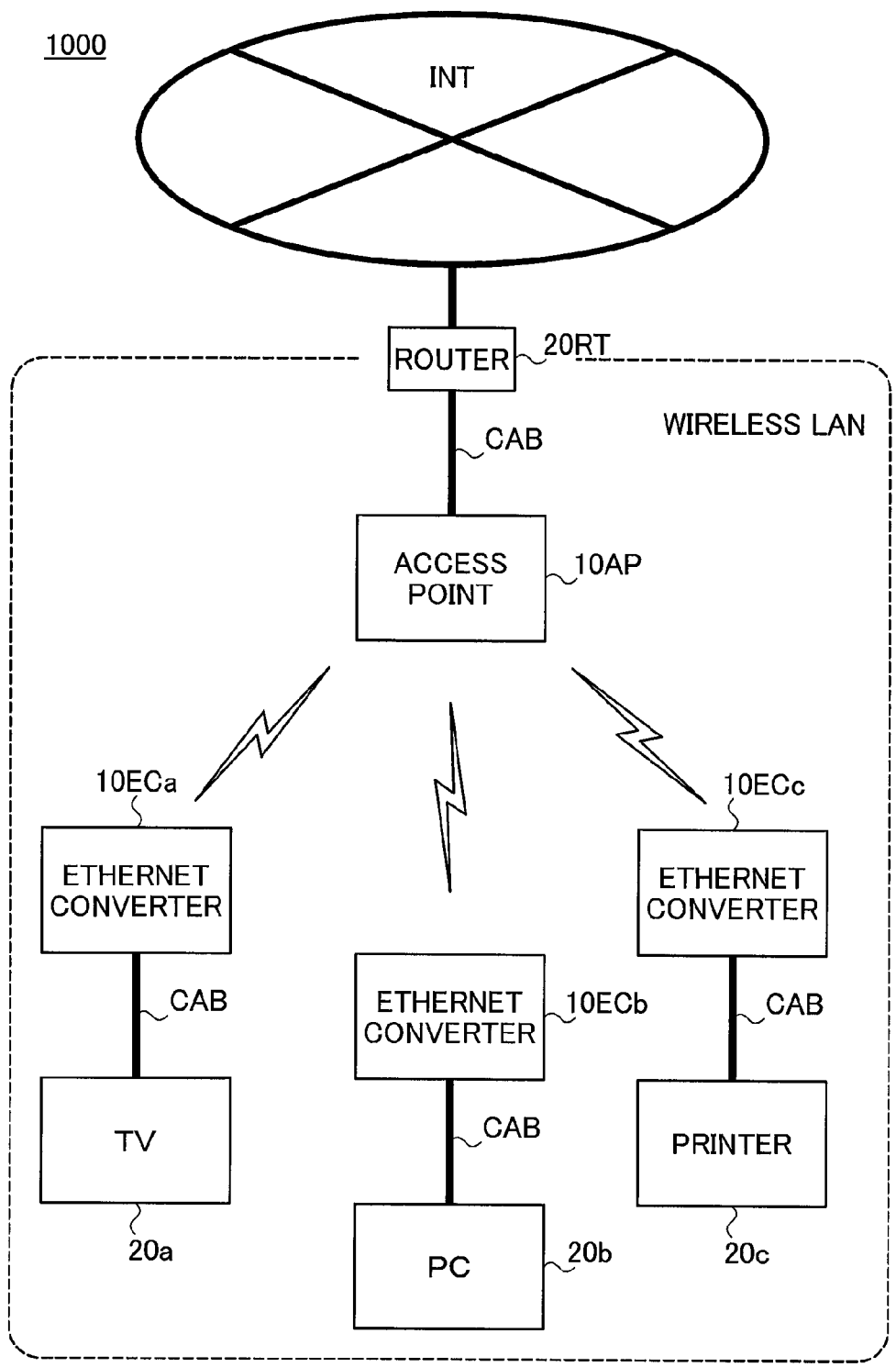
FIG. 1 depicts the general features of a network system 1000 implementing a wireless LAN device as an embodiment of the present invention.

FIG. 1 depicts the general features of a network system 1000 implementing a wireless LAN device as an embodiment of the present invention. As illustrated, in the network system 1000 of the present embodiment, the Internet INT and a wireless LAN are connected through a router 20RT. The router 20RT has DHCP (Dynamic Host Configuration Protocol) server functionality, specifically, functionality whereby when the device receives a DCHPDISCOVER packet, as a response it returns a DHCPOFFER packet including an IP address to the sender of the DCHPDISCOVER packet, and assigns the IP address to it.

In the network system 1000, the wireless LAN includes an access point 10AP connected to the router 20RT by a LAN cable CAB; and several Ethernet converters 10ECa, 10ECb, 10ECc. The Ethernet converters 10ECa, 10ECb, 10ECc are respectively connected via LAN cables CAB to a television receiver 20a, a personal computer (PC) 20b, and a printer 20c.

The television receiver 20a, the personal computer 20b, and the printer 20c are respectively equipped with wired communication sections including a LAN port, and are connectable to the network. The Ethernet converters 10ECa, 10ECb, 10ECc are connected wirelessly to the access point 10AP. The numbers of these various devices may be selected freely.

The Ethernet converters 10ECa, 10ECb, 10ECc convert wired packets received respectively from the television receiver 20a, the personal computer 20b, and the printer 20c into wireless packets, and transmit these to the access point 10AP. The Ethernet converters 10ECa, 10ECb, 10ECc also convert wireless packets received from the access point 10AP to wired packets, and transmit these to the television receiver 20a, the personal computer (PC) 20b, and the printer 20c respectively.

In the present embodiment, as will be discussed later, the access point 10AP and the Ethernet converters 10ECa, 10ECb, 10ECc have identical features. These are wireless LAN devices that, by switching the operating mode configuration, can be utilized either as a wireless base station (access point) or as a wireless terminal (client). These correspond to "the wireless LAN device" recited in the Summary. Herein, the access point 10AP and the Ethernet converters 10ECa, 10ECb, 10ECc are also referred to collectively as wireless LAN devices 10. The router 20RT, the television receiver 20a, the personal computer 20b, and the printer 20c are also referred to collectively as wired devices 20.

Where the access point 10AP is understood to function as "the wireless LAN device" recited in the Summary, the router 20RT corresponds to "a first network device" in the Summary, and the Ethernet converters 10ECa, 10ECb, 10ECc correspond to "second network devices". Where the Ethernet converter 10ECa, 10ECb, or 10ECc is understood to function as "the wireless LAN device" in the Summary, the television receiver 20a, the personal computer 20b, or the printer 20c respectively corresponds to "the first network device" in the Summary, and the access point 10AP corresponds to "a second network device".

A2. Wireless LAN Device Features

Figure 2:
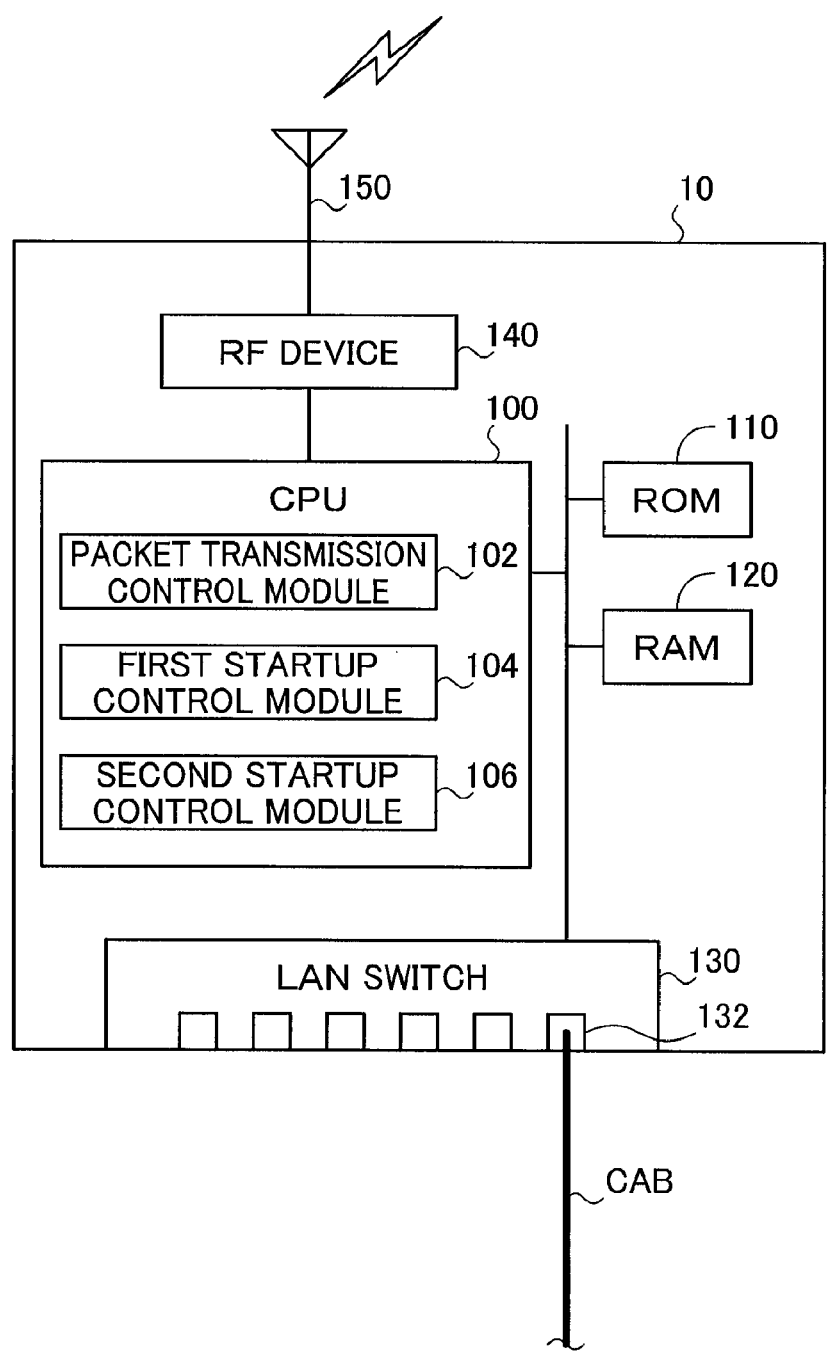
FIG. 2 depicts the general features of a wireless LAN device 10.

FIG. 2 depicts the general features of a wireless LAN device 10. As shown, the LAN device 10 is furnished with a CPU 100, a ROM 110, a RAM 120, a LAN switch 130, an RF device 140, and an antenna 150. While omitted from the drawing, the wireless LAN device 10 is also equipped with DFS (Dynamic Frequency Selection) functionality.

The LAN switch 130 is equipped with several LAN ports 132, to each of which is connected a LAN cable CAB. The LAN switch 130 carries out communication with the connected wired devices 20 via the LAN cables CAB. The LAN switch 130 corresponds to "the wired communication section" recited in the Summary. The wireless LAN device 10 of the present embodiment is equipped with a LAN switch 130 having multiple LAN ports 132, but a wired LAN port having a single port could be used instead.

The RF device 140 and the antenna 150 carry out wireless communication with other wireless LAN devices. The RF device 140 is a device for sending and receiving wireless signals via the antenna 150. The RF device 140 and the antenna 150 correspond to "the wireless communication section" recited in the Summary.

The CPU 100 carries out control of the entire wireless LAN device 10. By loading and executing a computer program saved in the ROM 110, the CPU 100 functions as a controller furnished with a packet transmission control module 102, a first startup control module 104, and a second startup control module 106, and is adapted to carry out a startup control process, discussed later.

At startup of the wireless LAN device 10, the packet transmission control module 102 performs a function of sending to the wired device 20 from the LAN switch 130 a DHCPDISCOVER packet for discovering available DHCP servers; and a function whereby the RF device 140 sends to other wireless LAN devices through the antenna 150 a Probe Request packet to discover wireless LAN access points that are available for wireless communication.

At startup of the wireless LAN device 10, in the event that the LAN switch 130 received a DHCPOFFER packet from the wired device 20 in response to the DHCPDISCOVER packet, the first startup control module 104 performs a function of starting up the wireless LAN device 10 in access point mode (wireless base station mode). The fact that the LAN switch 130 received a DHCPOFFER packet means that the wired device 20 is a network device having DHCP server functionality (e.g. the router 20RT). "Access point mode (wireless base station mode)" refers to an operating mode in which the wireless LAN device 10 operates as a wireless LAN access point (wireless base station). The first startup control module 104 corresponds to "the first operation controller" recited in the Summary.

At startup of the wireless LAN device 10, in the event that the RF device 140 received through the antenna 150 a Probe Response packet from the access point 10AP in response to the Probe Request packet, the second startup control module 106 performs a function of starting up the wireless LAN device in client mode (wireless terminal mode). "Client mode (wireless terminal mode)" refers to an operating mode in which the wireless LAN device 10 operates as a wireless LAN client (wireless terminal). The second startup control module 106 corresponds to "the second operation controller" recited in the Summary.

A3. Startup Control Process

Figure 3:
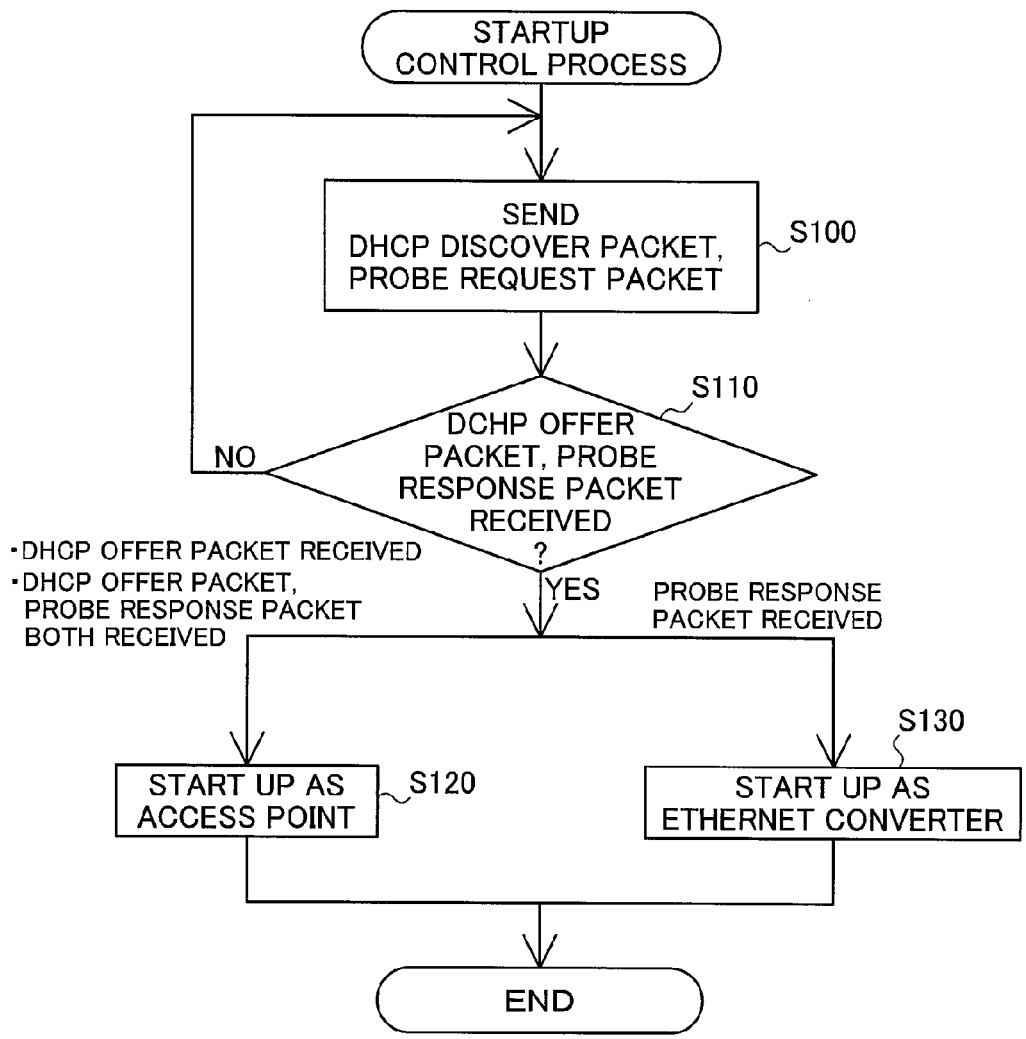
FIG. 3 is a flowchart depicting the flow of the startup control process of a wireless LAN device 10 of Embodiment 1.

FIG. 3 is a flowchart depicting the flow of the startup control process of a wireless LAN device 10 of Embodiment 1. This process is one that the CPU 100 (the packet transmission control module 102, the first startup control module 104, and the second startup control module 106) provided to the wireless LAN device 10 executes at startup of the wireless LAN device 10.

First, when the wireless LAN device 10 is powered on, the packet transmission control module 102 sends a DHCPDISCOVER packet from the LAN switch 130 to the connected wired device 20. In parallel with DHCPDISCOVER packet transmission, the packet transmission control module 102 also sends a Probe Request packet to other wireless LAN devices from the RF device 140 through the antenna 150 (Step S100).

The CPU 100 then decides whether a DHCPOFFER packet and/or a Probe Response packet were received (Step S110). If the wired device 20 for which the DHCPDISCOVER packet was destined is a network device having DHCP server functionality, the wireless LAN device 10 receives a DHCPOFFER packet in response to the DHCPDISCOVER packet. If on the other hand the wired device 20 is a network device lacking DHCP server functionality, the wireless LAN device 10 cannot receive a DHCPOFFER packet. If another wireless LAN device for which the Probe Request packet was destined is an access point, the wireless LAN device 10 receives a Probe Response packet in response to the Probe Request packet. If on the other hand the other wireless LAN device is not an access point, the wireless LAN device 10 cannot receive a Probe Response packet.

In Step S110, if only a DHCPOFFER packet was received, the first startup control module 104 acquires the IP address contained in the DHCPOFFER packet, and starts up the wireless LAN device 10 in access point (wireless base station) mode (Step S120). The CPU 100 then terminates the startup control process. Likewise, if both a DHCPOFFER packet and a Probe Response packet were received in Step S110, the first startup control module 104 acquires the IP address contained in the DHCPOFFER packet, and starts up the wireless LAN device 10 in access point (wireless base station) mode (Step S120). The CPU 100 then terminates the startup control process. Subsequently, the wireless LAN device 10 transmits beacon packets that include an SSID (Service Set ID) as an access point.

The fact that the wireless LAN device 10 receives a DHCPOFFER packet means that the wired device 20 having wired connection to the wireless LAN device 10 is a wired device 20 having DHCP server functionality (e.g. the router 20RT). If the user of the wireless LAN device 10 connects a wired device 20 having DHCP server functionality (e.g. the router 20RT) to the wireless LAN device 10, it is conceivable that the user intends to utilize the wireless LAN device 10 as a new access point (wireless base station), despite an existing access point on the wireless LAN. Through execution of Steps S110 and 120 in the startup control process, it is possible to reflect such user intention.

In Step S110, if only a Probe Response packet was received, the second startup control module 106 starts up the wireless LAN device 10 in Ethernet converter (wireless terminal) mode (Step S130), and terminates the startup control process. Subsequently, the wireless LAN device 10, in the capacity of an Ethernet converter, carries out a connection process to set up a wireless connection to an access point. This connection process can be implemented using AOSS™ for example. In Step S110, if neither a DHCPOFFER packet nor a Probe Response packet was received (Step S110: NO), the CPU 100 returns to Step S100.

According to the wireless LAN device 10 of Embodiment 1 described above, there is no need for the user to configure the operating mode in order to operate the wireless LAN device 10 as a wireless base station or to operate it as a wireless terminal. That is, according to the wireless LAN device 10 of Embodiment 1, it is possible to automate the process of configuring the operating mode of a wireless LAN device utilizable either as a wireless base station or a wireless terminal through switching of the operating mode configuration. Moreover, because the wireless LAN device 10 of Embodiment 1 affords automated configuration of operating mode as described above, thus avoiding mistakes in configuration of operating mode introduced through human error, the device is especially effective for building a wireless LAN having a star topology composed of a single wireless base station (access point) and several wireless terminals (clients).

Additionally, according to the wireless LAN device 10 of Embodiment 1, in the startup control process depicted in FIG. 3, DHCPDISCOVER packet transmission and DHCPOFFER packet reception on the one hand, and Probe Request packet transmission and Probe Response packet reception on the other, are carried out as parallel processes. Consequently, the time required to configure the operating mode of the wireless LAN device can be reduced, as compared to the case where DHCPDISCOVER packet transmission/DHCPOFFER packet reception and Probe Request packet transmission/Probe Response packet reception take place serially.

B. Embodiment 2

The hardware configurations of the network system 1000 and the hardware configurations of the wireless LAN device 10 of Embodiment 2 are identical to those in Embodiment 1. In Embodiment 2, the wireless LAN device 10 startup process differs from that of Embodiment 1. The wireless LAN device 10 startup process of Embodiment 2 is described below.

Figure 4:
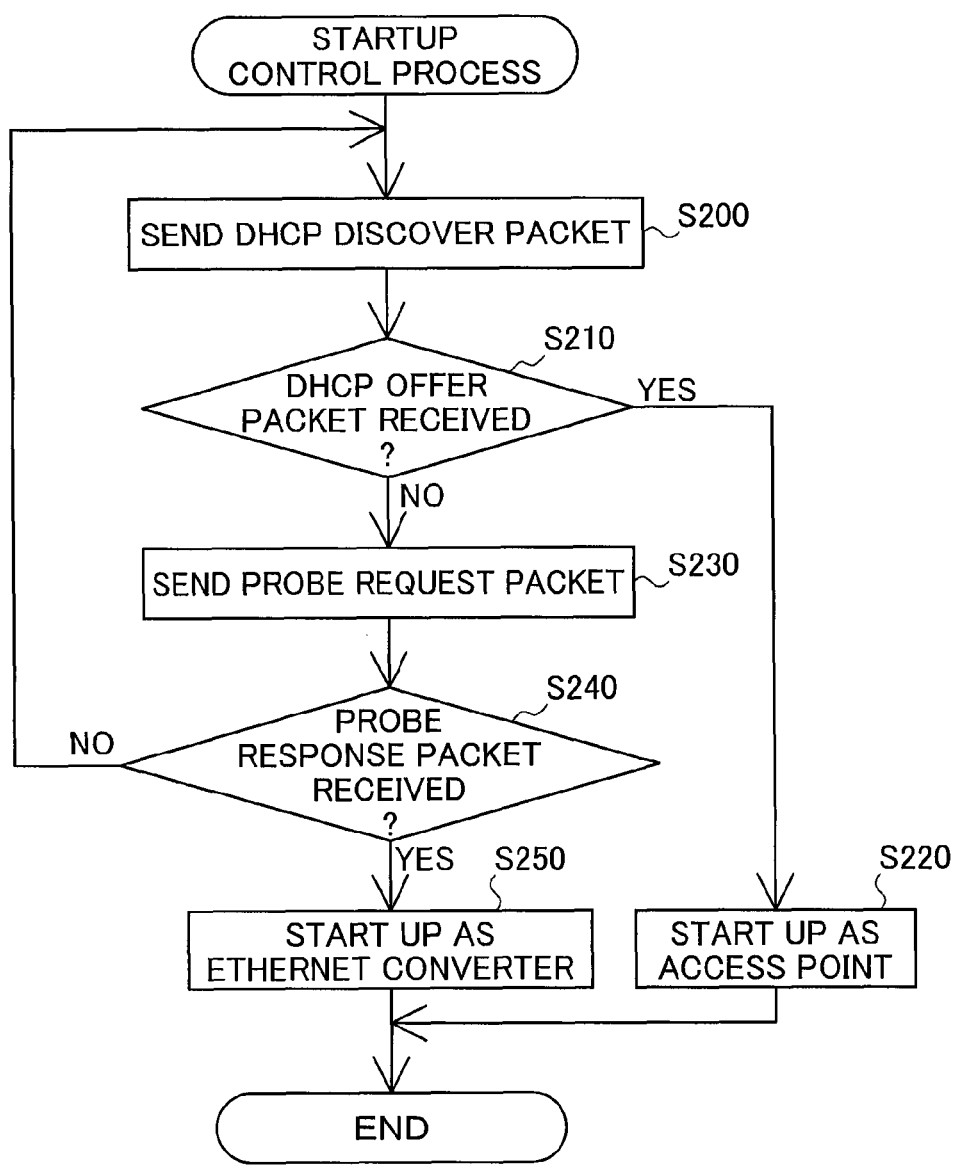
FIG. 4 is a flowchart depicting the flow of the startup control process of a wireless LAN device 10 of Embodiment 2.

FIG. 4 is a flowchart depicting the flow of the startup control process of a wireless LAN device 10 of Embodiment 2. This process is one that the CPU 100 (the packet transmission control module 102, the first startup control module 104, and the second startup control module 106) provided to the wireless LAN device 10 executes at startup of the wireless LAN device 10.

First, when the wireless LAN device 10 is powered on, the packet transmission control module 102 sends a DHCPDISCOVER packet from the LAN switch 130 to the connected wired device 20 (Step S200). The CPU 100 then decides whether a DHCPOFFER packet was received (Step S210). If the wired device 20 for which the DHCPDISCOVER packet was destined is a network device having DHCP server functionality, the wireless LAN device 10 receives a DHCPOFFER packet in response to the DHCPDISCOVER packet.

In Step S210, if a DHCPOFFER packet was received (Step S210: YES), the first startup control module 104 acquires the IP address contained in the DHCPOFFER packet, starts up the wireless LAN device 10 in access point (wireless base station) mode (Step S220), and then terminates the startup control process. Subsequently, the wireless LAN device 10 transmits beacon packets that include an SSID as an access point.

If on the other hand in Step S210, if no DHCPOFFER packet was received (Step S210: NO), the packet transmission control module 102 sends a Probe Request packet to other wireless LAN devices from the RF device 140 through the antenna 150 (Step S230). The CPU 100 then decides whether a Probe Response packet was received (Step S240). If another wireless LAN device for which the Probe Request packet was destined is an access point, the wireless LAN device 10 receives a Probe Response packet in response to the Probe Request packet.

In Step S240, if a Probe Request packet was received (Step S240: YES), the second startup control module 106 starts up the wireless LAN device 10 in Ethernet converter (wireless terminal) mode (Step S250), and terminates the startup control process. Subsequently, the wireless LAN device 10, in the capacity of an Ethernet converter, carries out a connection process to set up a wireless connection to an access point. This connection process can be implemented using AOSS™ for example. In Step S240, if no Probe Response packet was received (Step S240: NO), the CPU 100 returns to Step S200.

As with the wireless LAN device 10 of Embodiment 1, according to the wireless LAN device 10 of Embodiment 2 described above, it is possible to automate the process of configuring the operating mode of a wireless LAN device utilizable either as a wireless base station or a wireless terminal through switching of the operating mode configuration.

Moreover, according to the wireless LAN device 10 of Embodiment 2, in the startup control process depicted in FIG. 4, DHCPDISCOVER packet transmission/DHCPOFFER packet reception and Probe Request packet transmission/Probe Response packet reception take place serially. Consequently, the load on the CPU 100 per unit time can be reduced, as compared to the case where DHCPDISCOVER packet transmission/DHCPOFFER packet reception and Probe Request packet transmission/Probe Response packet reception take place in parallel. Also, according to the wireless LAN device 10 of Embodiment 2, if a DHCPOFFER packet was received in response to transmission of a DHCPDISCOVER packet in the startup control process, the process of transmitting a Probe Request packet can be omitted, and the wireless LAN device 10 started up in access point mode.

C. Embodiment 3

The hardware configurations of the network system 1000 of Embodiment 3 are identical to those in Embodiment 1. In Embodiment 3, the features of the wireless LAN device 10B and the startup control process differ from the features of the wireless LAN device 10 and the startup control process of Embodiment 1. The features of the wireless LAN device 10B and the startup control process of Embodiment 3 are described below.

Figure 5:
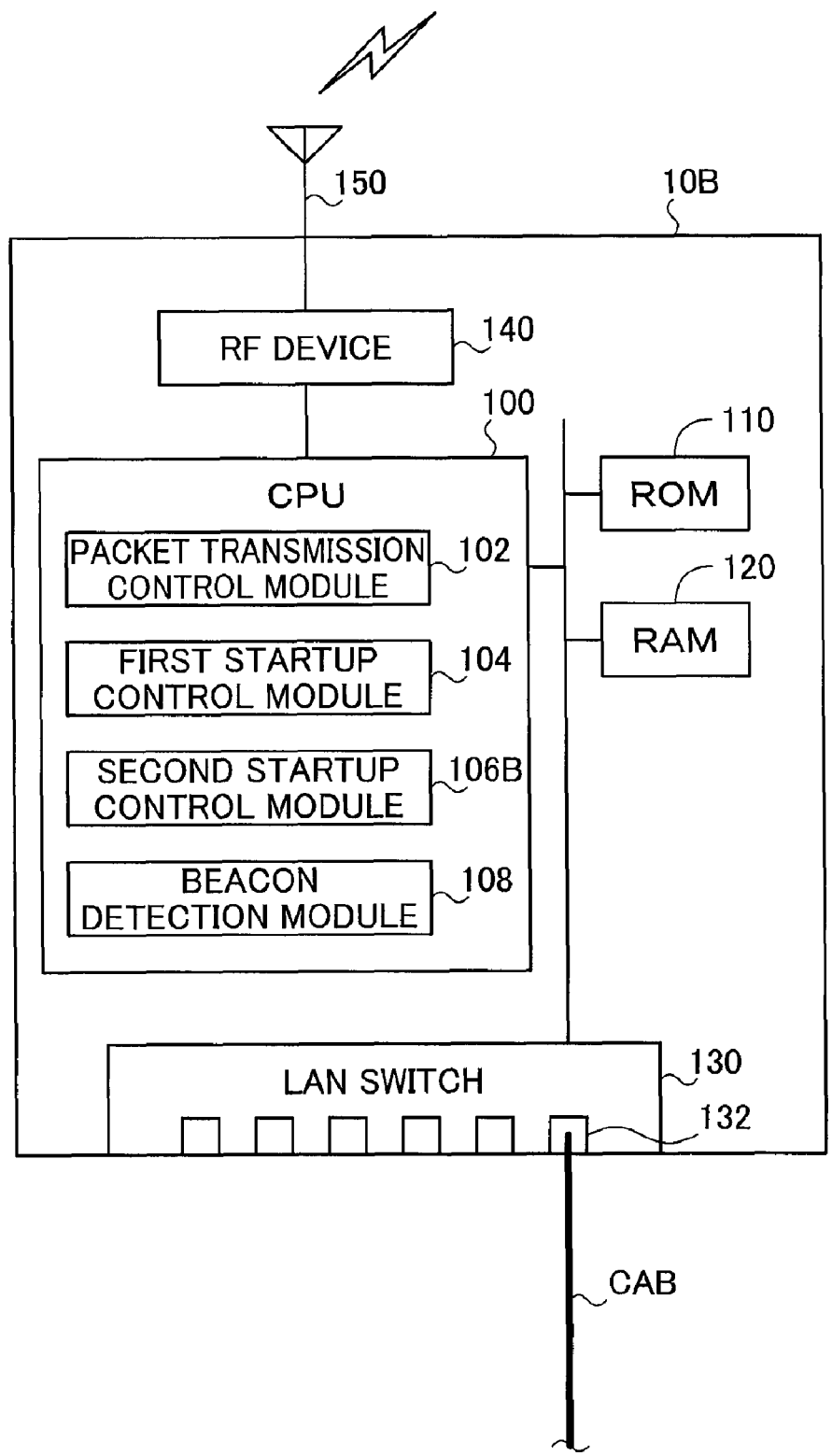
FIG. 5 depicts the general features of a wireless LAN device 10B of Embodiment 3.

FIG. 5 depicts the general features of a wireless LAN device 10B of Embodiment 3. As will be understood from a comparison of FIG. 5 and FIG. 2, the hardware features of the wireless LAN device 10B are identical to the hardware features of the wireless LAN device 10 in Embodiment 1. However, in the wireless LAN device 10B of Embodiment 3, the CPU 100 is provided with a second startup control module 106B in place of the second startup control module 106 in the wireless LAN device 10 of Embodiment 1, as one of the function blocks for carrying out the startup control process. Additionally, the CPU 100 is provided with a beacon detection module 108. The beacon detection module 108 detects beacon packets sent by another wireless LAN device (wireless base station) and received by the RF device 140 through the antenna 150. The beacon detection module 108 can also carry out parsing of beacon packet content (e.g. identification of the SSID).

Figure 6:
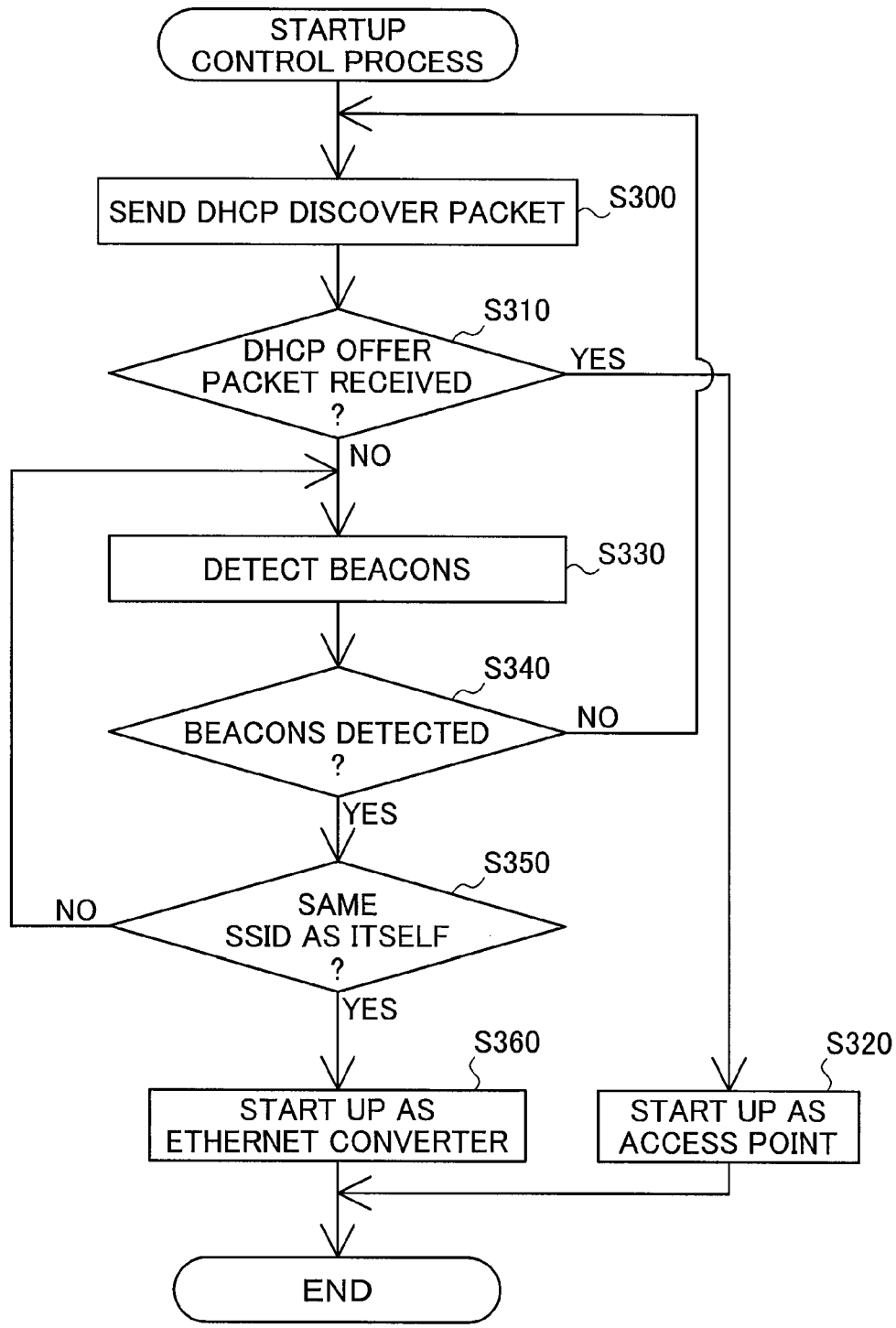
FIG. 6 is a flowchart depicting the flow of the startup control process of a wireless LAN device 10B of Embodiment 3.

FIG. 6 is a flowchart depicting the flow of the startup control process of the wireless LAN device 10B of Embodiment 3. This process is one that the CPU 100 (the packet transmission control module 102, the first startup control module 104, the second startup control module 106B, and the beacon detection module 108) provided to the wireless LAN device 10B executes at startup of the wireless LAN device 10B.

First, when the wireless LAN device 10B is powered on, the packet transmission control module 102 sends a DHCPDISCOVER packet from the LAN switch 130 to the connected wired device 20 (Step S300). The CPU 100 then decides whether a DHCPOFFER packet was received (Step S310). If a DHCPOFFER packet was received (Step S310: YES), the first startup control module 104 acquires the IP address contained in the DHCPOFFER packet, starts up the wireless LAN device 10B in access point (wireless base station) mode (Step S320), and terminates the startup control process.

If, on the other hand in Step S310, no DHCPOFFER packet was received (Step S310: NO), the beacon detection module 108 sniffs for beacon packets sent from other wireless LAN devices (Step S330), and decides whether beacon packets were detected (Step S340). If beacon packets were not detected (Step S340: NO), the CPU 100 returns to Step S300. On the other hand, if beacon packets were detected (Step S340: YES), the beacon detection module 106B parses whether the detected beacon packets have the same SSID as itself (Step S350).

In Step S350, if the beacon packets have the same SSID as itself (Step S350: YES), the second startup control module 106B starts up the wireless LAN device 10B in Ethernet converter (wireless terminal) mode (Step S360), and terminates the startup control process. In Step S350, if the beacon packets do not have the same SSID as itself (Step S350: NO), the CPU 100 returns to Step S330.

As with the wireless LAN devices 10 of Embodiments 1 and 2, according to the wireless LAN device 10B of Embodiment 3 described above, it is possible to automate the process of configuring the operating mode of a wireless LAN device utilizable either as a wireless base station or a wireless terminal through switching of the operating mode configuration.

In general, wireless LAN devices can use radio waves of various different frequency bands for wireless communications. However, in order to prevent radio wave interference, for certain frequency bands (e.g. the W53 and W56 bands) that are used preferentially by various kinds of radar, such as mobile radar for marine, aeronautical, or military uses, or stationary radar for meteorological use, specific restrictions are placed on the use of these bands for wireless communications in wireless LANs. Given this regulatory environment, it is necessary for wireless LAN devices to avoid transmitting Probe Request packets using radio waves of the restricted frequency bands mentioned above. Also, instances in which a wireless LAN device cannot transmit a Probe Request packet to other wireless LAN devices may arise for other reasons.

According to the wireless LAN device 10B of Embodiment 3, in the startup control process depicted in FIG. 6, prior to transmission of a Probe Request packet, by detecting beacon packets sent from another wireless LAN device (wireless base station) present on the wireless LAN and having the same SSID as itself, the device can recognize that there is existing wireless base station for itself present on the wireless LAN. If the wireless LAN device 10B of the present embodiment has detected the aforementioned beacon packets, it starts up in client (wireless terminal) mode without transmitting a Probe Request packet or receiving a Probe Response packet. That is, the wireless LAN device 10B of the present embodiment does not carry out transmission of Probe Request packets. Consequently, transmission of Probe Response packets using radio waves of the aforementioned frequency bands restricted for use in wireless LANs can be avoided. Additionally, the wireless LAN device 10B of the present embodiment can operate as a wireless terminal by detecting beacon packets, even if it cannot transmit Probe Response packets to other wireless LAN devices.

D. Embodiment 4

The hardware configurations of the network system 1000 and the hardware configurations of the wireless LAN device 10B of Embodiment 4 are identical to those in Embodiment 3. In Embodiment 4, the wireless LAN device 10B startup process differs from that of Embodiment 3. The wireless LAN device 10B startup process in Embodiment 4 is described below.

Figure 7:
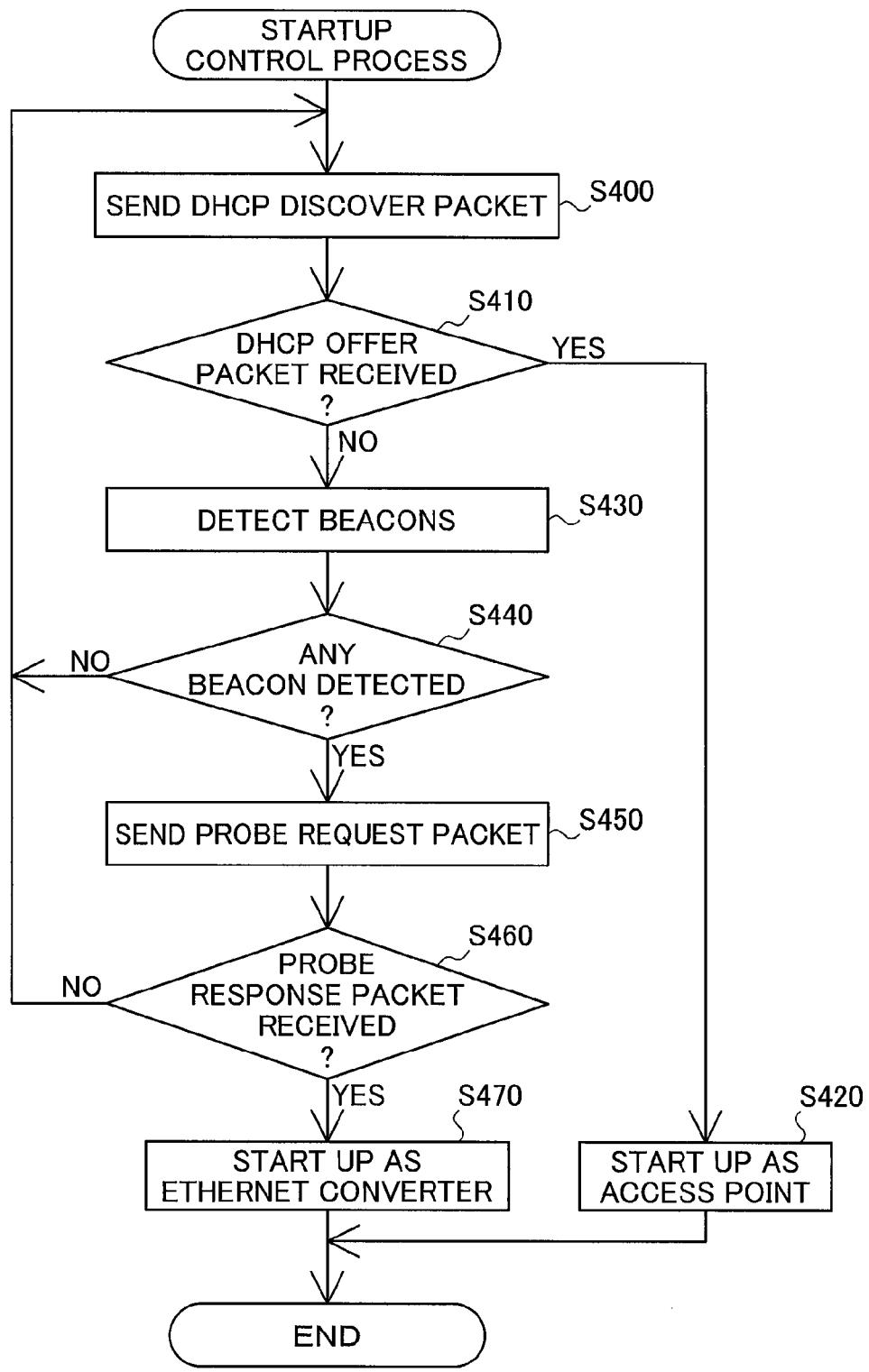
FIG. 7 is a flowchart depicting the flow of the startup control process of a wireless LAN device 10B of Embodiment 4.

FIG. 7 is a flowchart depicting the flow of the startup control process of a wireless LAN device 10B of Embodiment 4. This process is one that the CPU 100 (the packet transmission control module 102, the first startup control module 104, the second startup control module 106B, and the beacon detection module 108) provided to the wireless LAN device 10B executes at startup of the wireless LAN device 10B.

First, when the wireless LAN device 10B is powered on, the packet transmission control module 102 sends a DHCP-DISCOVER packet from the LAN switch 130 to the connected wired device 20 (Step S400). The CPU 100 then decides whether a DHCPOFFER packet was received (Step S410). If a DHCPOFFER packet was received (Step S410: YES), the first startup control module 104 acquires the IP address contained in the DHCPOFFER packet, starts up the wireless LAN device 10B in access point (wireless base station) mode (Step S420), and terminates the startup control process.

If on the other hand in Step S410, if no DHCPOFFER packet was received (Step S410: NO), the beacon detection module 108 sniffs for beacon packets sent from other wireless LAN devices (Step S430), and decides whether beacon packets were detected (Step S440). If beacon packets are not detected (Step S440: NO), the CPU 100 returns to Step S400.

In Step S440, if even a single beacon packet was detected (Step S440: YES), the packet transmission control module 102 decides it is possible that the base station sending the beacon packet constitutes a wireless base station with respect to itself; and without parsing the content of the detected beacon packets, sends a Probe Request packet to other wireless LAN devices from the RF device 140 through the antenna 150 (Step S450). The CPU 100 then decides whether a Probe Response packet was received (Step S460).

In Step S460, if a Probe Response packet was received (Step S460: YES), the second startup control module 106B starts up the wireless LAN device 10B in Ethernet converter (wireless terminal) mode (Step S470), and terminates the startup control process. In Step S460, if no Probe Response packet was received (Step S460: NO), the CPU 100 returns to Step S400.

As with the wireless LAN devices 10, 10B of Embodiments 1 to 3, according to the wireless LAN device 10B of Embodiment 4 described above, it is possible to automate the process of configuring the operating mode of a wireless LAN device utilizable either as a wireless base station or a wireless terminal through switching of the operating mode configuration.

Additionally, if for example several wireless base stations are present on a wireless LAN, the beacon detection module 108 provided to the wireless LAN device 10B detects multiple beacon packets. In such instances, for reasons relating to the CSMA/CA protocol for preventing collision (signal collision), there is a wait time until the beacon detection module 108 detects a beacon packet sent by a wireless base station having the same SSID as the wireless LAN device 10B. Additionally, it takes some time to identify the SSID contained in each of the beacon packets detected by the beacon detection module 108. Even if the beacon detection module 108 detects beacon packets, if the wireless base station that sent the beacon packets is configured to deny any connection, the beacon packets will not contain an SSID, and thus it cannot be determined whether the wireless base station has the same SSID as the wireless LAN device 10B.

According to the wireless LAN device 10B of Embodiment 4, in the startup control process shown in FIG. 7, if even one of the aforementioned beacon packets is detected, it is determined that there is a possibility that the base station sending the beacon packet constitutes a wireless base station in relation to itself; without parsing the beacon packets, Probe Response packet transmission and Probe Response packet reception are carried out; and if a Probe Response packet was received, the device operates in client (wireless terminal) mode. Consequently, the aforementioned wait time and time needed to identify the SSID in beacon packets can be reduced. Also, connection can be made even if a wireless base station has been configured to deny any connection.

E. Modified Examples

While the invention has been shown herein in terms of several preferred embodiments, the invention is not limited to such embodiments and may be reduced to practice in various other modes without departing from the spirit thereof, such as the following modifications for example.

E1. Modified Example 1

In the preceding embodiments, examples of implementation of the wireless LAN device of the present invention in an access point 10AP and in Ethernet converters 10ECa, 10ECb, 10ECc were shown; however, the invention is not limited to such arrangements. The present invention is generally adaptable to wireless LAN devices for relaying communications between wired network devices and wireless network devices, and which are utilizable either as a base station or a wireless terminal through switching of the operating mode. For example, USB ports and USB cables could be employed in place of the LAN ports 132 and the LAN cables CAB for connecting the wired network device (wired device 20) to the wireless LAN device 10.

E2. Modified Example 2

In the preceding embodiments, the startup control process of the wireless LAN device 10, 10B is executed each time that that the wireless LAN device 10, 10B is started up; however, the invention is not limited to such an arrangement. For example, the wireless LAN device 10, 10B could be designed so that the results of the startup control process (i.e. the operating mode) executed for the first time after the device is installed are saved; and during startup of the wireless LAN device 10, 10B subsequent times, the device starts up in this saved operating mode. Also, during startup of the wireless LAN device 10, 10B, it could be determined whether there has been any change of the wired devices 20 connected to the LAN switch 130; and if there has been any change of the wired devices 20 connected to the LAN switch 130, a new startup control process could be executed. Change of the wired devices 20 connected to the LAN switch 130 is detectable on the basis of unique identifying information of each wired device 120.

E3. Modified Example 3

In the preceding embodiments, configuration of the wireless LAN device 10, 10B operating mode is carried out as part of the startup control process at startup (powering on) of the wireless LAN device 10, 10B; however, the invention is not limited to such an arrangement. For example, the wireless LAN device 10, 10B could be provided with a reset button, and designed so that the operating mode of the wireless LAN device 10, 10B is configured when this reset button is pressed. Configuration of the wireless LAN device 10 operating mode could also be carried out each time that a new wired device 20 is connected to the LAN switch 130.

F. Variations

The present invention may be addressed according to the following modes of the invention.

According to a First Aspect of the invention, there is provided:

a wireless LAN device having a wired connection to a first network device and a wireless connection to a second network device, and adapted to relay communications between the first network device and the second network device, comprising:

a wired communication section configured to communicate with the first network device;

a wireless communication section configured to communicate with the second network device; and a controller configured to control operation of the wireless LAN device so that the wireless LAN device operates as an access point or a client in a wireless LAN;

wherein the controller includes:

a packet transmission controller that has a function of transmitting a DHCPDISCOVER packet from the wired communication section to the first network device and a function of transmitting a Probe Request packet from the wireless communication section to the second network device, respectively at prescribed timing;

a first operation controller that controls operation of the wireless LAN device so that the wireless LAN device operates as the access point, when the wired communication section receives a DCHPOFFER packet from the first network device in response to the DHCPDISCOVER packet; and a second operation controller that controls operation of the wireless LAN device so that the wireless LAN device operates as the client, when the wireless communication section receives a Probe Response packet from the second network device in response to the Probe Request packet.

In the case where the first network device is a network device that has DHCP (Dynamic Host Configuration Protocol) server functionality, when the first network device receives a DHCPDISCOVER packet, in response it sends back a DHCPOFFER packet to the wireless LAN device that sent the DHCPDISCOVER packet. In the case where on the other hand the first network device is a network device that lacks DHCP server functionality, despite receiving a DHCPDISCOVER packet, the first wireless LAN device cannot send back a DHCPOFFER packet to the wireless LAN device that sent the DHCPDISCOVER packet.

In the case where the second network device is an access point (wireless base station), when the second network device receives a Probe Request packet, in response it sends back a Probe Response packet to the wireless LAN device that sent the Probe Request packet. On the other hand, in the case where the second network device is not an access point (wireless base station), despite receiving a Probe Request packet, the second network device cannot send back a Probe Response packet to the wireless LAN device that sent the Probe Request packet.

In the case where the wireless LAN device according to the first aspect receives a DHCPOFFER packet from the first network device in response to a DHCPDISCOVER packet, this means that a network device having DHCP server functionality is connected to the wireless LAN device. In this case, the first operation controller of the wireless LAN device of the first aspect can control operations of the wireless LAN device in access point mode (wireless base station mode) so as to enable the wireless LAN device to operate as an access point (wireless base station). In the case where wireless LAN device according to the first aspect receives a Probe Response packet from the second network device in response to a Probe Request packet, this means that there is an existing access point (wireless base station) on the wireless LAN. In this case, the second operation controller of the wireless LAN device of the first aspect can control operations of the wireless LAN device in client mode (wireless terminal mode) so as to enable the wireless LAN device to operate as a client (wireless terminal).

Consequently, the wireless LAN device of the first aspect does not require the user to configure the operating mode in order to operate the wireless LAN device as a wireless base station or operate it as a wireless terminal. That is, with the wireless LAN device of the present aspect, it is possible to automate the process of configuring the operating mode of a wireless LAN device utilizable either as a wireless base station or a wireless terminal through switching of the operating mode configuration. Because the wireless LAN device of the present aspect affords automated configuration of operating mode as described above, and thus avoids mistakes in configuration of operating mode introduced through human error, the device is especially effective for building a wireless LAN having a star topology composed of a single wireless base station (access point) and several wireless terminals (clients).

According to a Second Aspect of the invention, there is provided:

the wireless LAN device according to claim 1 wherein the prescribed timing is the time of startup of the wireless LAN device.

According to the wireless LAN device of the second aspect, configuration of the operating mode of the wireless LAN device can take place automatically at startup of the wireless LAN device, without any configuration procedure by the user.

According to a Third Aspect of the invention, there is provided:

the wireless LAN device according to claim 1 wherein when the wired communication section receives the DCHPOFFER packet in response to the DHCPDISCOVER packet, and additionally the wireless communication section receives the Probe Response packet in response to the Probe Request packet, the first operation controller controls operation of the wireless LAN device so that the wireless LAN device operates as the access point, without the second operation controller controlling operation of the wireless LAN device so that the wireless LAN device operates as the client.

The wireless LAN device receives a DCHPOFFER packet when the first network device having a wired connection to the wireless LAN device is a first network device having server functionality. When the user of the wireless LAN device connected a first network device to the wireless LAN device, it is conceivable that the intention of the user is to utilize the wireless LAN device as a new access point (wireless base station), despite an existing access point on the wireless LAN. With the wireless LAN device of the third aspect, it is possible to reflect such user intention.

According to a Fourth Aspect of the invention, there is provided:

the wireless LAN device according to claim 1 wherein the packet transmission controller carries out the transmission of the DHCPDISCOVER packet and the transmission of the Probe Request packet as parallel processes.

According to the wireless LAN device of the fourth aspect, the time required to configure the operating mode of the wireless LAN device can be reduced, as compared to the case where transmission of the DHCPDISCOVER packet and transmission of the Probe Request packet take place serially.

According to a Fifth Aspect of the invention, there is provided:

the wireless LAN device according to claim 1 wherein the packet transmission controller carries out the transmission of the DHCPDISCOVER packet and the transmission of the Probe Request packet by first sending one of the packets, and then sending the other packet.

According to the wireless LAN device of the fifth aspect, the load on the controller per unit time can be reduced, as compared to the case where transmission of the DHCPDISCOVER packet and transmission of the Probe Request packet take place in parallel.

According to a Sixth Aspect of the invention, there is provided:

the wireless LAN device according to claim 5 wherein the packet transmission controller carries out the transmission of the DHCPDISCOVER packet, and then carries out the transmission of the Probe Request packet.

According to the wireless LAN device of the sixth aspect, if a DCHPOFFER packet was received in response to transmission of a DHCPDISCOVER packet, the process of transmitting a Probe Request packet can be omitted, and the wireless LAN device started up in access point mode. Consequently, the time required to configure the operating mode of the wireless LAN device can be reduced.

According to a Seventh Aspect of the invention, there is provided:

the wireless LAN device according to claim 6 wherein the controller further includes a beacon detector that, prior to the transmission of the Probe Request packet by the packet transmission controller, performs a passive scan to detect beacon packets transmitted from other wireless LAN devices present on the wireless LAN, and when the beacon packets detected by the beacon detector have a same SSID (Service Set ID) as the wireless LAN device, the second operation controller controls operation of the wireless LAN device so that the wireless LAN device operates as the client without carrying out the transmission of the Probe Request packet by the packet transmission controller or the reception of the Probe Response packet by the wireless communication section.

In general, wireless LAN devices can use radio waves of various different frequency bands for wireless communications. However, in order to prevent radio wave interference, for certain frequency bands (e.g. the W53 and W56 bands) that are used preferentially by various kinds of radar, such as mobile radar for marine, aeronautical, or military uses, or stationary radar for meteorological use, specific restrictions are placed on the use of these bands for wireless communications in wireless LANs. Given this regulatory environment, it is necessary for wireless LAN devices to avoid transmitting Probe Request packets using radio waves of the restricted frequency bands mentioned above. Also, instances in which a wireless LAN device cannot transmit a Probe Request packet to other wireless LAN devices may arise for other reasons.

According to the wireless LAN device of the seventh aspect, prior to transmission of a Probe Request packet, by detecting beacon packets sent from another wireless LAN device present on the wireless LAN and having the same SSID as itself, the device can recognize the presence of an existing wireless base station for itself in the wireless LAN. When the wireless LAN device of the present aspect has detected the aforementioned beacon packets, it starts up in client (wireless terminal) mode without transmitting a Probe Request packet or receiving a Probe Response packet. That is, the wireless LAN device of the present aspect does not carry out transmission of Probe Request packets. Consequently, transmission of Probe Response packets using radio waves of the restricted frequency bands mentioned above can be avoided. Additionally, the wireless LAN device of the present aspect can operate as a wireless terminal by detecting beacon packets, even if it cannot transmit Probe Response packets to other wireless LAN devices.

According to a Eighth Aspect of the invention, there is provided:

the wireless LAN device according to claim 6 wherein the controller further includes a beacon detector that, prior to the transmission of the Probe Request packet by the packet transmission controller, performs a passive scan to detect beacon packets transmitted by another wireless LAN device present on the wireless LAN, the packet transmission controller carries out the transmission of the Probe Request packet after the beacon packets are detected by the beacon detector, and when the Probe Response packet was received, the second operation controller controls operation of the wireless LAN device so that the wireless LAN device operates as the client.

As in the seventh aspect, in instances where radar of various kinds is using frequency bands such as the W53 and W56 bands, it is necessary for the wireless LAN device to carry out detection of beacon packets by passive scanning, since it cannot transmit radio waves of these frequency bands. However, when for example several wireless base stations are present on a wireless LAN, because the device detects beacon packets having the same SSID as itself, the beacon detector detects multiple beacon packets. In such instances, for reasons having to do with to the CSMA/CA (Carrier Sense Multiple Access/Collision Avoidance) protocol for preventing collision (signal collision), there is a wait time until the beacon detector detects beacon packets sent by a wireless base station having the same SSID as the wireless LAN device. Additionally, it takes some time to identify the SSID contained in each of the beacon packets detected by the beacon detector. Even when the beacon detector detects beacon packets, if the wireless base station that sent the beacon packets is configured to deny any connection, the beacon packets will not contain an SSID, and thus it cannot be determined whether that wireless base station has the same SSID as the wireless LAN device.

According to the wireless LAN device of the eighth aspect, when one of the aforementioned beacon packets is detected, it is determined that it is possible that the base station sending the beacon packet is the wireless base station for the device itself; without parsing each beacon packet, Probe Response packet transmission and Probe Response packet reception are carried out; and when a Probe Response packet is received, the device operates in client (wireless terminal) mode. Consequently, the aforementioned wait time and time needed to identify the SSID in beacon packets can be reduced. Also, connection can be made even if a wireless base station has been configured to deny any connection.

Some of the features implemented through hardware in the preceding embodiments could be substituted by software, and conversely some of the features implemented through software could be substituted by hardware.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more less or only a single element, are also within the spirit and scope of the invention.

What is claimed is:

1. A wireless LAN device that can be wired to a first network device, wirelessly connected to a second network device, and adapted to relay communications between the first network device and the second network device, comprising:
    a wired communication section for communicating with the first network device;
    a wireless communication section for communicating with the second network device; and
    a controller for controlling the operation of the wireless LAN device so that the wireless LAN device operates as an access point or a client in a wireless LAN;
    wherein the controller includes:
        a packet transmission controller that has a function of transmitting a DHCPDISCOVER packet from the wired communication section to the first network device at prescribed timing and a function of transmitting a Probe Request packet from the wireless communication section to the second network device at prescribed timing;
        a first operation controller that can control the operation of the wireless LAN device so that the wireless LAN device can operate as the access point when the wired communication section receives a DCHPOFFER packet from the first network device in response to the DHCPDISCOVER packet; and
        a second operation controller that can control the operation of the wireless LAN device so that the wireless LAN device can operate as the client when the wireless communication section receives a Probe Response packet from the second network device in response to the Probe Request packet.

2. The wireless LAN device according to claim 1 wherein the prescribed timing is the time of startup of the wireless LAN device.

3. The wireless LAN device according to claim 1 wherein when the wired communication section receives the DCHPOFFER packet in response to the DHCPDISCOVER packet and additionally the wireless communication section receives the Probe Response packet in response to the Probe Request packet, the second operation controller does not control the operation of the wireless LAN device so that the wireless LAN device can operate as the client, and the first operation controller controls the operation of the wireless LAN device so that the wireless LAN device can operate as the access point.

4. The wireless LAN device according to claim 1 wherein the packet transmission controller carries out the transmission of the DHCPDISCOVER packet and the transmission of the Probe Request packet as parallel processes.

5. The wireless LAN device according to claim 1 wherein the packet transmission controller alternately transmits the DHCPDISCOVER packet and the Probe Request packet.

6. The wireless LAN device according to claim 5 wherein the packet transmission controller transmits the DHCPDISCOVER packet and the Probe Request packet in this order named.

7. The wireless LAN device according to claim 6 wherein the controller further includes a beacon detector that, prior to the transmission of the Probe Request packet by the packet transmission controller, can detect beacon packets transmitted from other wireless LAN devices present on the wireless LAN; and when the beacon packet detected by the beacon detector has the same SSID (Service Set ID) as the wireless LAN device, the second operation controller controls the operation of the wireless LAN device so that the wireless LAN device operates as the client without the transmission of the Probe Request packet by the packet transmission controller and without the reception of the Probe Response packet by the wireless communication section.

8. The wireless LAN device according to claim 6 wherein the controller further includes a beacon detector that, prior to the transmission of the Probe Request packet by the packet transmission controller, can detect beacon packets transmitted by another wireless LAN device present on the wireless LAN;

the packet transmission controller transmits the Probe Request packet after the beacon packet has been detected by the beacon detector; and when the Probe Response packet has been received, the second operation controller controls the operation of the wireless LAN device so that the wireless LAN device operates as the client.

\* \* \* \* \*